US008057592B2

(12) United States Patent
Fenn et al.

(10) Patent No.: US 8,057,592 B2
(45) Date of Patent: Nov. 15, 2011

(54) CATIONIC ELECTRODEPOSITABLE COATINGS COMPRISING ROSIN

(75) Inventors: David Fenn, Allison Park, PA (US); Gregory J. McCollum, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 802 days.

(21) Appl. No.: 11/780,796

(22) Filed: Jul. 20, 2007

(65) Prior Publication Data

US 2009/0020038 A1 Jan. 22, 2009

(51) Int. Cl.
*C08L 93/00* (2006.01)
*C08G 8/34* (2006.01)

(52) U.S. Cl. ..................... 106/218; 525/54.42

(58) Field of Classification Search ............... 525/529, 525/54.42; 106/218
See application file for complete search history.

(56) References Cited

U.S. PATENT DOCUMENTS

| | | | |
|---|---|---|---|
| 2,653,142 A | 9/1953 | Cody | |
| 3,057,809 A | 10/1962 | Newey | |
| 3,366,563 A | 1/1968 | Hart | |
| 3,518,212 A * | 6/1970 | Ruecke | 525/530 |
| 3,658,736 A * | 4/1972 | Daimer | 204/489 |
| 3,658,738 A * | 4/1972 | Westrenen | 527/601 |
| 3,668,098 A | 6/1972 | Daimer | |
| 3,950,286 A | 4/1976 | Hoenel | |
| 3,959,198 A | 5/1976 | Broecker | |
| 3,966,654 A | 6/1976 | Aldrich | |
| 3,971,708 A * | 7/1976 | Davis et al. | 204/472 |
| 4,024,095 A | 5/1977 | Broecker | |
| 4,188,312 A | 2/1980 | Kempfer | |
| 4,219,382 A * | 8/1980 | Leffler | 162/180 |
| 4,246,087 A * | 1/1981 | Tsou et al. | 428/418 |
| 4,292,214 A | 9/1981 | Blount | |
| 4,434,256 A * | 2/1984 | Dworak et al. | 523/402 |
| 4,715,898 A * | 12/1987 | Johnson | 106/503 |
| 4,812,508 A | 3/1989 | Makhlouf | |
| 4,857,149 A | 8/1989 | Tiedeman | |
| 5,021,538 A | 6/1991 | Crews | |
| 5,116,945 A * | 5/1992 | Osawa et al. | 530/215 |
| 5,175,250 A | 12/1992 | Hazen | |
| 5,393,337 A * | 2/1995 | Nakamura et al. | 106/238 |
| 5,739,184 A | 4/1998 | Marbry et al. | |
| 5,767,191 A * | 6/1998 | Zawacky et al. | 524/591 |
| 6,060,539 A | 5/2000 | Hermansen | |
| 6,229,054 B1 | 5/2001 | Dai | |
| 6,262,148 B1 | 7/2001 | Cheng | |
| 6,303,676 B1 | 10/2001 | Catena | |
| 6,908,995 B2 | 6/2005 | Blount | |
| 2005/0027043 A1 | 2/2005 | Yao | |
| 2006/0004115 A1 | 1/2006 | Ittara | |
| 2008/0121140 A1 | 5/2008 | Fenn | |

FOREIGN PATENT DOCUMENTS

| | | |
|---|---|---|
| EP | 0217660 | 4/1987 |
| EP | 0420063 B1 | 4/1991 |
| EP | 0611024 A2 | 8/1994 |
| GB | 1318056 | 5/1973 |
| GB | 1524407 | 9/1978 |
| GB | 2237019 | 4/1991 |
| JP | 54135007 A | 10/1979 |
| JP | 62025182 A | 2/1987 |
| JP | 62192476 A | 8/1987 |
| JP | 04202413 A | 7/1992 |
| JP | 05097968 | 4/1993 |
| JP | 07179565 | 7/1995 |
| JP | 2001233947 A | 8/2001 |
| KR | 100559055 B | 3/2006 |
| WO | 8704448 | 7/1987 |
| WO | 0138446 | 5/2001 |
| WO | WO 0138446 A1 * | 5/2001 |
| WO | 0204084 A2 | 1/2002 |
| WO | 2004/031306 A1 | 4/2004 |

OTHER PUBLICATIONS

Wadhwani, Meena et al., "Electrophoretic Coatings based on Phenolic Resins", Asian Journal of Chemistry, 1994, pp. 67-71, vol. 6, No. 1, Ghaziabad, India.
Vargiu, S. et al., "Air drying epoxy-phenolic systems", FATIPEC Congress, 1978, pp. 529-533, 14.
Panda, Himadri et al., "Studies on speciality monomers from rosin", paintindia, Jun. 2002; pp. 67-76, Metrocoat Rajapalayam (P) Ltd., Tamil Nadu, India.
Mustata, Fanica et al., "Polyhydroxyetheresters from resin acids", Polimery 2005; 2004, pp. 176-181, 50, No. 3.
Das et al., "Bio oil from pyrolysis of cashew nut shell-characterisation and related properties", Biomass and Bioenergy, 2004, pp. 265-275, vol. 27, Elsevier Ltd.
Lora et al., "Recent Industrial Applications of Lignin: A Sustainable Alternative to Nonrenewable Materials", Journal of Polymers and the Environment, Apr. 2002; pp. 39-48, vol. 10, Nos. 1/2, Plenum Publishing Corporation.
Sun et al., "Comparative study on the curing kinetics and mechanism of a lignin-based-epoxy/anhydride resin system", Polymer, Dec. 19, 2006; pp. 330-337, vol. 48, No. 1, Elsevier Science Publishers B.V., Great Britain.
Ramasri, M. et al., "New binders for cathodic electrodeposition from epoxy resins", Journal of the Oil and Color Chemists' Association, 1986, vol. 69, No. 9, pp. 248-251, Oil and Color Chemists' Association, London, United Kingdom.
U.S. Appl. No. 11/780,711, filed Jul. 20, 2007, entitled: "Aqueous Dispersions and Coatings Comprising Modified Epoxy Resins Comprising the Reaction Product of Rosin and a Dienophile".
U.S. Appl. No. 11/780,732, filed Jul. 20, 2007, entitled: "Modified Epoxy Resins Comprising the Reaction Product of Rosin and a Linking Molecule and Aqueous Dispersions and Coatings Comprising Such Resins".
U.S. Appl. No. 11/780,867, filed Jul. 20, 2007, entitled: "Modified Epoxy Resins Comprising the Reaction Product of a Biomass Derived Compound and an Epoxy Resin, and Aqueous Dispersions and Coatings Comprising Such Resins".

* cited by examiner

*Primary Examiner* — Mark Eashoo
*Assistant Examiner* — David Karst
(74) *Attorney, Agent, or Firm* — Diane R. Meyers

(57) ABSTRACT

Cationic electrodepositable coatings comprising rosin, wherein the rosin forms part of the cationic resin backbone, are disclosed.

18 Claims, No Drawings

CATIONIC ELECTRODEPOSITABLE COATINGS COMPRISING ROSIN

FIELD OF THE INVENTION

The present invention relates generally to cationic electrodepositable coatings comprising rosin, wherein the rosin forms part of the cationic resin backbone.

BACKGROUND OF THE INVENTION

Prices of raw materials used in many manufacturing processes continue to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a cationic electrodepositable coating comprising rosin, wherein the rosin forms part of the cationic resin backbone.

DETAILED DESCRIPTION OF THE INVENTION

The present invention is directed to cationic electrodepositable coatings or "ecoats" comprising rosin. The rosin forms part of the cationic resin backbone.

It will be understood that rosin actually comprises a mixture of compounds, with abietic acid often being predominant (i.e. more abietic acid than any other component). Rosin is commercially available as, for example, gum rosin, wood rosin, and tall oil rosin. Abietic acid may be used according to the present invention in its natural form or it may be purified using techniques known to those skilled in the art. In its natural form as a rosin or rosin acid, the abietic acid may be present with isomeric forms such as levoprimaric and resin acids of the pimaric type. Oleoresin material can also be present, as can dihydroabietic acid and dehydroabietic acid. Since rosin is a complex mixture of mainly twenty carbon atom fused ring, mono-carboxylic acids and a small amount of nonacidic components, where the resin acid molecule has the double bonds and the carboxylic acid group, it may be possible for a derivative to be used that maintains the carboxylic acid group. One suitable example of rosin that can be used is SYLVAROS NCY, a tall oil rosin available from Arizona Chemical, and another is Brazilian Gum rosin from Gehring-Montgomery.

As noted above, the rosin forms part of the cationic backbone. That is, components of or moieties on the rosin are modified to make them polymerizable with other components of the coating, and they are therefore polymerized during the preparation of the cationic resin. Thus, the rosin forms part of the cationic resin backbone. Thus, the present invention is distinct from inventions in which rosin is used as an additive; when used as an additive, the rosin is not modified and does not react into the backbone of the coating.

As noted above, the rosin is modified or adapted so that it will form part of the cationic backbone. These adapted rosins are sometimes referred to herein as a rosin adduct. "Rosin", therefore, is meant to include rosin or any compound comprising rosin, or a residue of rosin. In certain embodiments, the rosin is reacted with a dienophile comprising a carboxylic and/or anhydride group, and then reacted with an epoxy resin. More specifically, the rosin is reacted with a dienophile comprising a carboxylic and/or anhydride group. Particularly suitable dienophiles include α, β-ethylenically unsaturated mono or dicarboxylic acids or anhydrides such as fumaric acid, maleic acid, acrylic acid, methacrylic acid, itaconic acid, citraconic acid and maleic anhydride. Any other dienophile comprising a carboxylic group can also be used.

The rosin and the dienophile can be reacted in a Diels Alder reaction under conditions well known in the art, such as between the melting point of the rosin and the boiling point of the dienophile. The reaction can be carried out at elevated pressure in order to increase the boiling point of the dienophile. The Diels Alder reaction between rosin and a dienophile containing a carboxylic and/or anhydride group or groups is described, for example, in Polymer from Renewable Resources—13, Polymers from Rosin Acrylic Acid Adduct, Roy, Kundu and Maiti, Eur. Polym. J., 26(4), 471, 1990; and in Diels-Alder Polymers from Resinic Acids, Mustata and Bicu, Journal of Polymer Engineering, 25(3), 217, 2005, both of which are incorporated by reference herein. This reaction will result in the carboxylated Diels Alder adduct of the rosin ("rosin adduct"). It will be appreciated that the rosin adduct will have on average more than one carboxylic acid functionality per molecule. In certain embodiments, the rosin adduct has two carboxylic acid functionalities, one from the rosin and one from the dienophile. The number of carboxylic acid groups per molecule of rosin adduct can be controlled by varying the number of carboxylic acid groups per molecule of dienophile and/or by varying the ratio of rosin to dienophile. Use of a dienophile with one carboxylic acid group per molecule is particularly suitable. The molar ratio of rosin acid groups to dienophile can be 1:0.25 to 1:2, such as 1:0.5 to 1:1.1, or 1:0.8 to 1:1. When the rosin adduct contains more than two carboxylic acid and/or anhydride functionalities, some of the carboxylic acid and/or anhydride functionalities can be removed by modification of the rosin adduct with a compound having a functionality reactive with carboxylic acid/anhydride, for example an epoxy group or a hydroxyl group. Examples of such modifying compounds include CARDURA E10 (glycidyl ester of versatic acid, available from Hexion specialty Chemicals), propylene oxide or octanol The rosin can comprise 95 to 40, such as 90 to 70, wt % of the total solids weight of the rosin adduct.

The rosin can also be reacted with a linking molecule. A "linking molecule", as used herein, is any polyfunctional molecule (i.e. two or greater functional groups and/or points of functionality) that will react with the rosin in such a way that the rosin remains acid functional. In certain embodiments the linking molecule is not a dienophile, such as a compound that would undergo a Diels Alder reaction with the rosin. Because the linking molecule has at least two functional groups and/or points of functionality, it can react with at least two rosin molecules. This results in at least two rosin molecules becoming joined by having reacted with the linking molecule ("rosin adduct").

Suitable linking molecules include, for example, formaldehyde or glyoxal. Reaction between the rosin and the dienophile can be carried under any suitable conditions, for example those described in "Study of the Condensation Products of Abietic Acid with Formaldehyde" by Bicu and Mustata. Die Angew. Makromol., 213, 169, 1993, which is incorporated by reference herein. The rosin adduct will contain molecules having at least two carboxylic acid functionalities, one from each of the rosin molecules, joined to the linking molecule. The rosin can comprise 50 to 99.9, such as 80 to 98, wt % of the total solids weight of the rosin adduct.

The rosin adduct, such as that formed by reaction of rosin with a dienophile or a linking molecule, is then reacted with the epoxy resin. Alternatively, the rosin, which will be understood as having one or more epoxy reactive functional groups, can be reacted directly with an epoxy resin. In certain embodiments, particularly those in which the rosin is reacted directly with the epoxy resin, the epoxy resin has at least two epoxy functionalities. A portion of the epoxy functionality will react with one of the carboxylic acid functionalities on the rosin adduct or the rosin itself to form the present modified epoxy resin, and a portion of the epoxy functionality will remain unreacted. The reaction product of the rosin and/or rosin adduct and the epoxy resin is sometimes referred to herein as a modified epoxy or a modified epoxy resin.

Suitable epoxy resins include but are not limited to those having a 1,2-epoxy equivalency greater than one, such as at least two; that is, polyepoxides that have on average two epoxide groups per molecule. In general, the epoxide equivalent weight of the polyepoxide can range from 100 to 2000, such as from 180 to 1200, or from 180 to 500. The epoxy resin may be saturated or unsaturated, cyclic or acyclic, aliphatic, alicyclic, aromatic or heterocyclic. It may contain substituents such as halogen, hydroxyl, and/or ether groups. Particularly suitable polyepoxides are polyglycidyl ethers of polyhydric alcohols, such as cyclic polyols, such as polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Other cyclic polyols can also be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl)cyclohexane. Epoxy group-containing acrylic polymers can also be used. These polymers typically have an epoxy equivalent weight ranging from about 750 to 2000. Because a portion of the epoxy functionality remains unreacted, the modified epoxy resin is epoxy functional. "Epoxy functional", and like terms, as used herein refer to a compound or polymer having at least one unreacted epoxy group. This epoxy group can undergo reaction with, for example, a carboxylic acid to form an ester bond or with a primary amine to form a secondary amine or with a secondary amine to form a tertiary amine. In this manner, the modified epoxy resin used according to the present invention can be crosslinked or can otherwise form at least a portion of a coating.

The modified epoxy resin can be prepared by any means known in the art, such as the methods that follow: the epoxy resin and rosin and/or rosin adduct are reacted together neat or in the presence of an inert organic solvent; any suitable solvent can be used, such as a ketone, including methyl isobutyl ketone and methyl amyl ketone; aromatics such as toluene and/or xylene; and/or glycol ethers such as the dimethyl ether of diethylene glycol. The reaction is typically conducted at a temperature of 80° C. to 160° C. for 30 to 180 minutes until an epoxy group-containing resinous reaction product is obtained. Alternatively the reaction can be carried out in a continuous reactor and can be conducted at a temperature of 140° C. to 280° C. for 1 to 20 minutes. The equivalent ratio of reactants, i.e. epoxy groups:carboxylic acid groups, is typically from 1.00:0.20 to 1.00:0.80.

It will be appreciated that the reaction between the rosin and/or rosin adduct and the epoxy resin may actually yield a mixture of reaction products including molecules containing rosin adduct, epoxy resin and two epoxy groups, molecules containing rosin adduct, epoxy resin and one epoxy group, unreacted epoxy resin, and/or unreacted rosin adduct. Use of an excess of epoxy resin in the reaction will minimize if not eliminate the presence of unreacted rosin and/or rosin adduct in the reaction mixture. The conditions can be controlled to result in a reaction mixture that is predominantly molecules containing rosin and/or rosin adduct, epoxy resin and two epoxy groups.

It will be appreciated that upon formation of the modified epoxy, the epoxy ring will open and a hydroxy group will be formed. This hydroxy group can be further reacted with a compound having one or more hydroxy reactive groups. A hydroxy reactive group is a group that reacts with hydroxy. This increases the molecular weight of the modified epoxy resin. Increased molecular weight can result in increased performance, such as increased solvent resistance, corrosion resistance, hardness and/or stability. The compound having one or more hydroxy reactive groups can be a polyisocyanate. Suitable polyisocyanates include, but are not limited to, aliphatic diisocyanates like hexamethylene diisocyanate and isophorone diisocyanate and aromatic diisocyanates like toluene diisocyanate and 4,4'-diphenylmethane diisocyanate. Examples of other suitable polyisocyanates include, but are not limited to, isocyanurate trimers, allophanates, and uretdiones of diisocyanates. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include LUPRANATE M20S, sold by BASF Corporation, DESMODUR N3390, sold by Bayer Corporation, and TOLONATE HDT90 which is sold by Rhodia Organics. The reaction with a compound having one or more hydroxy reactive groups is particularly suitable when rosin is reacted directly with epoxy.

A "coating" according to the present invention will generally be understood as a composition that, when cured, can form a substantially continuous film that forms a surface layer that provides a decorative and/or protective function, and in certain embodiments is not tacky or sticky when cured. Thus, in certain embodiments, the coating according to the present invention would not include adhesives. In certain other embodiments, the coating of the present invention would not include laminates.

It will be appreciated that the rosin as described herein, as used in the present coatings, will form part of the cationic backbone. That is, the rosin and/or a derivative thereof will be incorporated into the backbone of the resin, which then reacts with a curing agent or crosslinker to form the coating. It will be appreciated by those skilled in the art that a cured coating in which rosin is used as a solvent, chain transfer agent, or tackifier or other additive would have a relatively low amount of rosin in it as distinguished from certain embodiments of the present invention. Thus, rosin can comprise 5 to 75 wt %, such as 20 to 60 wt %, based on the total solid weight of the coating. In some embodiments, the coating comprises at least 20 wt %, such as at least 30 wt % rosin, with weight percent based on the total solid weight of the coating.

In certain embodiments, one or more additional film-forming resins are also used in the coating. For example, the coating compositions can comprise any of a variety of thermoplastic and/or thermosetting compositions known in the art.

Thermosetting or curable coating compositions typically comprise film forming polymers or resins having functional groups that are reactive with either themselves or a crosslinking agent. The film-forming resin can be selected from, for example, epoxy resins, acrylic polymers, polyester polymers, polyurethane polymers, polyamide polymers, polyether polymers, bisphenol A based epoxy polymers, polysiloxane polymers, copolymers thereof, and mixtures thereof. In certain particularly suitable embodiments, the cationic resin backbone comprises an aromatic or cyclic based epoxy, such as a bisphenol A based epoxy. "Aromatic or cyclic based epoxy" means a compound that contains both an aromatic or cyclic moiety as well as an epoxy moiety. Generally, these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, an hydride groups, acetoacetate acrylates, uretidione and combinations thereof. In certain embodiments, acrylic is not the primary film former; that is, the resin that forms the predominant (i.e. more than any other) component of the resin is not acrylic. Certain other embodiments are substantially free from acrylic. "Substantially free from acrylic" means that only trace amounts, such as less than 5 wt %, 2 wt % or 1 wt %, of acrylic are present, if any.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. In certain embodiments, the modified epoxy resin can be self crosslinking. Self crosslinking means that the reaction product contains functional groups that are capable of reacting with themselves, such as alkoxysilane groups, or that the reaction product contains functional groups that are coreactive, for example hydroxyl groups and blocked isocyanate groups. In certain embodiments, blocked isocyanate groups can be introduced into the modified epoxy resin by reacting residual epoxy groups with the reaction product of a polyamine containing primary and secondary amine groups and an acyclic carbonate as described in WO 2006110515, incorporated by reference herein.

As noted above, the present coatings are electrodepositable and contain cationic salt groups. Accordingly, the modified epoxy and any other film-forming resin should be capable of being converted into a cationic salt group, or otherwise be reactive with another coating component capable of being converted into a cationic salt group. For example, the modified epoxy can have epoxy functionality, which can be converted to a cationic salt group. Cationic salt groups can be introduced by any means known in the art such as by the reaction of an epoxy group-containing reaction product of the types described above with appropriate salt forming compounds. For example, sulfonium salt groups can be introduced by reacting a sulfide in the presence of an acid, as described in U.S. Pat. Nos. 3,959,106 and 4,715,898, incorporated by reference herein; amine salt groups can be derived from the reaction of an epoxide functional reaction product with a compound containing a primary or secondary amine group, such as methylamine, diethanolamine, ammonia, diisopropanolamine, N-methyl ethanolamine, diethylentri-amine, dipropylenetriamine, bishexamethylenetriamine, the diketimine of diethylentriamine, the diketimine of dipropylenetriamine, the diketimine of bishexamethylenetriamine and mixtures thereof. The cationic salt groups can be at least partially neutralized with an acid. Suitable acids include organic and inorganic acids such as formic acid, acetic acid, lactic acid, phosphoric acid, dimethylolpropionic acid and sulfamic acid. Mixtures of acids can be used. The resin can contain primary, secondary and/or tertiary amino groups.

It will be appreciated that in formulating electrodepositable coating compositions according to the present invention, the modified epoxy, such as in the forms described above, can be dispersed in a dispersing medium. The dispersing medium can be water. The dispersion step may be accomplished by combining the neutralized or partially neutralized modified epoxy with the dispersing medium. Neutralization and dispersion can be accomplished in one step by combining the modified epoxy and the dispersing medium. The reaction product described above can be added to the dispersing medium or the dispersing medium can added to the reaction product (or its salt). In certain embodiments, the pH of the dispersion is within the range of 4 to 9. The dispersion can be formed at a suitable solids level for the final coating, for example 5 to 15 weight percent, or it can be formed at higher solids, for example 20 to 45 weight percent, to minimize the weight and volume of material that needs to be stored and/or transported. The dispersion can then be adjusted to a suitable solids level for coating prior to use. Alternatively the resin, optionally blended with the crosslinker, can be stored and transported as an organic solution and dispersed shortly before use. Suitable conditions for forming such stable dispersions include those set forth in the Examples.

The rosin-containing cationic salt resin according to the present invention can then be used in an ecoat like any other cationic salt known in the art. The rosin-containing cationic salt can comprise 10 to 90 wt %, such as 10 to 60 wt % of the ecoat. In certain embodiments, the ecoat can further comprise one or more other resins commonly used in electrodepositable coatings. Examples include a cationic acrylic resin, such as one derived from an epoxy functional acrylic resin, or the film-forming resins discussed above. In certain embodiments of the present invention the coatings specifically exclude rubber, such as alkene or modified alkene rubbers.

The coating compositions may also include a solvent. Suitable solvents include water, organic solvent(s) and/or mixtures thereof. Suitable solvents include glycols, glycol ether alcohols, alcohols, ketones, aromatics, such as xylene and toluene, acetates, mineral spirits, naphthas and/or mixtures thereof. "Acetates" include the glycol ether acetates.

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, and other customary auxiliaries.

As used herein, "colorant" and like terms mean any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated.

Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and or fillers and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

The coatings of the present invention can be substantially clear. "Substantially clear" as used herein means that one can see through the coating and that objects viewed through the coating will be visible without significant distortion. It will be appreciated that use of certain colorants will still result in a coating that is substantially clear.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. patent application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the composition.

The present coatings can be applied to any substrates known in the art, for example automotive substrates and industrial substrates. These substrates are electrically conductive, such as metal, or treated to be electrically conductive, such as by application of an electrically conductive paint.

The coatings can be applied to a dry film thickness of 0.1 to 5 mils, such as 0.5 to 3.0 or 0.9 to 2.0 mils. Even thicker layers, such as 20 to 100 mils, or up to 150 mils, are contemplated in certain embodiments of the present invention. The coatings of the present invention can be used alone, or in combination with other coatings. For example, the coatings can be pigmented or unpigmented, and can be used with a primer, base coat, and/or top coat.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein, including the claims, to "a" rosin, "a" dienophile, "a" linking molecule, "an" epoxy resin, "a" rosin-containing compound, "a" modified epoxy, "an" epoxy resin, "a" compound having one or more reactive hydroxy groups, and the like, one or more of each of these and any other components can be used. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

|   |   | Mass (/g) |
|---|---|---|
| A | gum rosin[1] | 496.25 |
| B | acrylic acid | 102.72 |
| C | 4-methoxyphenol | 1.03 |

[1]Brazillian gum rosin, available from Gehring-Montgomery.

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 222.5 mg KOH/g.

Example 2

|   |   | Mass (/g) |
|---|---|---|
| A | SYLVAROS NCY[2] | 165.1 |
| B | acrylic acid | 34.55 |
| C | hydroquinone | 0.55 |

[2]Tall oil rosin, available from Arizona Chemical.

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 225.1 mg KOH/g.

Example 3

|   |   | Mass (/g) |
|---|---|---|
| A | gum rosin | 518.67 |
| B | acrylic acid | 80.52 |
| C | 4-methoxyphenol | 0.80 |

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 213.2 mg KOH/g.

Example 4

|   |   | Mass (/g) |
|---|---|---|
| A | gum rosin | 496.25 |
| B | acrylic acid | 102.72 |
| C | 4-methoxyphenol | 1.03 |

Components A, B and C were charged to a 1-liter stirred stainless steel pressure reactor. The agitation on the reactor was set at 500 rpms and the reactor temperature was adjusted to 140° C. The temperature was then increased to 200° C. and the pressure was adjusted to 1000 PSI with nitrogen. These conditions were maintained for one hour. The reactor was then cooled to 120° C. and vented and the reaction mixture was poured on to a foil-lined tray and allowed to cool before being broken up in to small pieces. The product had an acid value of 231.7 mg KOH/g.

Example 5

|   |   | Mass (/g) |
|---|---|---|
| 1 | EPON 828[3] | 244.21 |
| 2 | rosin adduct of Example 1 | 202.38 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker, prepared as described below | 194.84 |
| 7 | DETA diketimine[4] | 15.22 |
| 8 | N-methyl ethanolamine | 3.05 |

[3]Glycidyl ether of Bisphenol A, available from Resolution.
[4]Diketimine formed from diethylene triamine and methylisobutyl ketone (72.69% solids in methylisobutyl ketone).

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.1 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 27.8 percent. The reaction product had Z average molecular weight of 156 783 (determined by gel permeation chromatography in DMF using polystyrene as a standard).

Example 6

|   |   | Mass (/g) |
|---|---|---|
| 1 | EPON 828 | 219.81 |
| 2 | rosin adduct from Example 2 | 183.80 |
| 3 | ethyltriphenyl phosphonium iodide | 0.28 |
| 4 | methyl isobutyl ketone | 23.51 |
| 5 | methyl isobutyl ketone | 0.66 |
| 6 | crosslinker | 176.08 |
| 7 | DETA diketimine | 13.76 |
| 8 | N-methyl ethanolamine | 2.76 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (558.6 g) was dispersed in aqueous medium by adding it to a mixture of 23.08 g of sulfamic acid and 305.23 g of deionized water warmed to 30° C. under vigorous agitation. After 30 minutes, 4.80 g of a 30% solution of gum rosin in butylcarbitol formal was added followed, 45 minutes later by 445.85 g of deionized water. The dispersion was thinned with more deionized water and vacuum stripped to remove organic solvent to give a dispersion having a solids content of 31.0 percent. The reaction product had Z average molecular weight of 48 876 (determined by gel permeation chromatography in DMF using polystyrene as a standard).

Example 7

|   |   | Mass (/g) |
|---|---|---|
| 1 | EPON 828 | 238.50 |
| 2 | rosin adduct from Example 3 | 208.10 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.07 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 35.5 percent. The reaction product had Z average molecular weight of 33 896 (determined by gel permeation chromatography in DMF using polystyrene as a standard).

Example 8

|   |   | Mass (/g) |
|---|---|---|
| 1 | EPON 828 | 245.76 |
| 2 | rosin adduct of Example 4 | 200.84 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.07 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 32.0 percent. The reaction product had Z average molecular weight of 47 612 (determined by gel permeation chromatography in DMF using polystyrene as a standard).

The crosslinker was prepared from the following ingredients:

| INGREDIENTS | PARTS BY WEIGHT |
|---|---|
| Bis (hexamethylene) triamine[5] | 1938.51 |
| Propylene carbonate | 1840.68 |
| Methyl isobutyl ketone | 1619.65 |

[5]DYTEK BHMT-HP available from Invista.

The bis (hexamethylene) triamine was charged to a reaction vessel and heated under a nitrogen atmosphere. The propylene carbonate was added over 3 hours. The reaction mixture exothermed to 68° C. and was then cooled and maintained at 60° C. The mixture was held at 60° C. for an additional 2 hours and then methyl isobutyl ketone was added.

Example 9

This example describes the preparation of an electrodeposition bath composition. The electrodeposition bath was prepared from a mixture of the following ingredients:

| INGREDIENTS | PARTS BY WEIGHT |
|---|---|
| Resin and deionized water | See table below |
| Plasticizer[6] | 7.3 |
| Flexibilizer[7] | 96.7 |
| Flow Additive[8] | 74.8 |
| ethylene glycol monohexylether. | 12.0 |
| propylene glycol monomethyl ether | 5.7 |
| pigment paste prepared as described below | 140.8 |

[6]MAZON-1651, a plasticizer based on butyl carbitol and formaldehyde, available from BASF.
[7]An aqueous dispersion of a flexibilizer/flow control agent generally in accordance with U.S. Pat. No. 4,423,166. The flexibilizer/flow control agent was prepared from a polyepoxide (EPON 828) and a polyoxyalkylenepolyamine (JEFFAMINE D2000 from Texaco Chemical Co.). The flexibilizer/flow control agent was dispersed in aqueous medium with the aid of lactic acid and the dispersion had a resin solids content of 46.2 percent by weight.
[8]A cationic microgel prepared as generally described in Examples A and B of U.S. Pat. No. 5,096,556 with the exception that acetic acid instead of lactic acid was used to disperse the soap of Example A, and EPON 828 solution was added after stripping rather than before in Example B. The resin had a final solids content of 17.9%.

| Cationic Dispersion | Dispersion Parts by Weight | De-ionized Water Parts by Weight |
|---|---|---|
| Example 7 | 987.5 | 1087.1 |
| Example 8 | 1094.6 | 968.0 |

The paint was made by adding the plasticizer, flexibilizer, flow additive, and solvents to the cationic dispersion. The blend was then reduced with 500 parts of the deionized water. The pigment paste is reduced with 300 parts of the deionized water, and then blended into the reduced resin mixture under agitation. The remainder of the deionized water was then added under agitation. Final bath solids were about 20%, with a pigment to resin ratio of 0.12:1.0. The paint was allowed to agitate at least two hours. Thirty percent of the total paint weight was removed by ultrafiltration and replaced with deionized water.

The pigment paste used above was prepared from a mixture of the following ingredients:

| INGREDIENTS | PARTS BY WEIGHT |
|---|---|
| Cationic grind resin[9] | 525.3 |
| SURFYNOL GA[10] | 1.4 |
| catalyst paste, prepared as described below | 175.3 |
| ASP-200[11] | 316.6 |
| CSX-333[12] | 4.3 |
| TRONOX CR800E[13] | 40.3 |
| Deionized water | 50.3 |

[9]As described in Example 2 of U.S. Pat. No. 4,715,898.
[10]Nonionic surfactant, available from Air Products and Chemicals, Inc.
[11]Aluminum silicate, available from Engelhard Corporation.
[12]Carbon black beads, available from Cabot Corp.
[13]Titanium dioxide pigment, available from Tronox Inc.

The above ingredients were added sequentially under high shear agitation. After the ingredients were thoroughly blended, the pigment paste was transferred to a vertical sand mill and ground to a Hegman value of about 7.25. The pigment paste was then collected. The measured solids were 55% following 1 hr @ 110° C.

The catalyst paste was prepared from a mixture of the following ingredients:

| INGREDIENTS | PARTS BY WEIGHT |
|---|---|
| Cationic grind resin[14] | 527.7 |
| n-Butoxypropanol | 6.9 |
| FASCAT 4201[15] | 312.0 |
| Deionized water | 59.8 |

[14]As described in Example 2 of U.S. Pat. No. 4,715,898, plus 2% by weight on solids of ICOMEEN T-2, available from BASF.
[15]Available from Arkema, Inc.

The catalyst paste was prepared by sequentially adding the above ingredients under high shear agitation. After the ingredients were thoroughly blended, the pigment paste was transferred to a vertical sand mill and ground to a Hegman value of about 7.25. The catalyst paste was then collected. The measured solids were 51% following 1 hr @ 110° C.

Electrocoating Procedure:

Bath compositions prepared as described above were electrodeposited onto phosphated cold rolled steel panels, commercially available from ACT Laboratories. The phosphate, which is commercially available from PPG Industries, Inc., was CHEMFOS 700 with a deionized water rinse. Conditions for cationic electrodeposition were 2 minutes at 92° F., voltages are listed in the chart below, specific to each resin to yield a cured dry film thickness of about 0.80 mils. The electrocoated substrates were cured in an electric oven for 25 minutes at 350° F. The electrocoated panels were tested against a standard electrocoat product and the results are recorded in Table 1. The control product is ED-6280 electrocoat available from PPG Industries Inc.

TABLE 1

| | Test Paint based on dispersion of Example 7 | Test Paint based on dispersion of Example 8 | ED6280 Control Paint |
|---|---|---|---|
| Applied Voltage | 150 | 200 | 175 |
| Scribe creep - 20 cycles Corrosion Testing[16] | 4.0 mm | 3.5 mm | 3.25 mm |
| Solvent Resistance[17] | Very slight mar | Very slight mar | No effect |
| QCT humidity adhesion[18] | 10 | 10 | 10 |

[16]Each coated panel was scribed, cutting through the coating to the metal substrate in an X pattern. The test panels were then subjected to cyclic corrosion testing by rotating test panels through a salt solution, room temperature dry, and humidity and low temperature in accordance with General Motors test method, GM TM 54-26. Scribe creep is reported as the maximum width (in millimeters) of corrosion across the scribe mark.
[17]A cloth soaked in acetone was rubbed back and forth across the panel for a period of 100 double strokes. The amount of surface damage that has occurred was then rated.
[18]Crosshatch adhesion performed before and after condensing humidity exposure for 16 hours at 140° F. on a QCT condensation tester (Q-Panel Company, Cleveland, OH). A rating of 10 indicates no adhesion failure.

Example 10

|   |   | Mass (/g) |
|---|---|---|
| 1 | gum rosin | 807.19 |
| 2 | toluene | 200.48 |
| 3 | p-formaldehyde | 83.36 |
| 4 | p-toluenesulfonic acid | 8.97 |

Components 1-3 were charged to a flask equipped with a nitrogen inlet, stirrer, condenser and thermocouple. The flask contents were heated slowly until they reached 95° C. and this temperature was maintained for 90 minutes. The flask was then equipped with a Dean and Stark separator filled with toluene and the temperature was increased until reflux began. Sixty minutes later toluene was drained from the Dean and Stark until the reflux temperature increased to 150° C. Reflux was continued for three hours, draining water of reaction and toluene as necessary to maintain 150° C. The reaction mixture was then poured on to a foil lined tray and allowed to cool before being broken up in to small pieces. The product had an acid value of 124.6 mg KOH/g.

Example 11

|   |   | Mass (/g) |
|---|---|---|
| 1 | gum rosin | 204.64 |
| 2 | toluene | 50.82 |
| 3 | p-formaldehyde | 42.26 |
| 4 | p-toluenesulfonic acid | 2.27 |

Components 1-3 were charged to a flask equipped with a nitrogen inlet, stirrer, condenser and thermocouple. The flask contents were heated slowly until they reached 95° C. and this temperature was maintained for 90 minutes. The flask was then equipped with a Dean and Stark separator filled with toluene and the temperature was increased until reflux began. Sixty minutes later toluene was drained from the Dean and Stark until the reflux temperature increased to 150° C. Reflux was continued for three hours, draining water of reaction and toluene as necessary to maintain 150° C. The reaction mixture was then poured on to a foil lined tray and allowed to cool before being broken up in to small pieces. The product had an acid value of 122.2 mg KOH/g.

Example 12

|   |   | Mass (/g) |
|---|---|---|
| 1 | gum rosin | 382.34 |
| 2 | toluene | 94.96 |
| 3 | p-formaldehyde | 118.45 |
| 4 | p-toluenesulfonic acid | 4.25 |

Components 1-3 were charged to a flask equipped with a nitrogen inlet, stirrer, condenser and thermocouple. The flask contents were heated slowly until they reached 95° C. and this temperature was maintained for 90 minutes. The flask was then equipped with a Dean and Stark separator filled with toluene and the temperature was increased until reflux began. Sixty minutes later toluene was drained from the Dean and Stark until the reflux temperature increased to 150° C. Reflux was continued for three hours, draining water of reaction and toluene as necessary to maintain 150° C. The reaction mixture was then poured on to a foil lined tray and allowed to cool before being broken up in to small pieces. The product had an acid value of 111.5 mg KOH/g.

Example 13

|   |   | Mass (/g) |
|---|---|---|
| 1 | rosin adduct of Example 10 | 248.82 |
| 2 | EPON 828 | 197.78 |
| 3 | ethyltriphenyl phosphonium iodide | 0.30 |
| 4 | methyl isobutyl ketone | 20.30 |
| 5 | methyl isobutyl ketone | 6.44 |
| 6 | crosslinker prepared as described below | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 135° C. and then this temperature was maintained for two hours. 5 was added and the temperature was adjusted to 127° C. 6 and 7 were added, followed one minute later by 8. After the exotherm, the temperature was adjusted to 116° C. and this temperature was maintained for two hours. The resin mixture (618.1 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 30.4 percent. The reaction product had Z average molecular weight of 9852 (determined by gel permeation chromatography in DMF using polystyrene as a standard).

Example 14

|   |   | Mass (/g) |
|---|---|---|
| 1 | rosin adduct from Example 10 | 269.43 |
| 2 | EPON 828[3] | 196.57 |
| 3 | ethyltriphenyl phosphonium iodide | 0.32 |
| 4 | methyl isobutyl ketone | 21.18 |
| 5 | methyl isobutyl ketone | 13.92 |
| 6 | crosslinker | 172.81 |
| 7 | DETA diketimine | 13.50 |
| 8 | N-methyl ethanolamine | 2.70 |

Components 1-4 were charged to a flask equipped with a nitrogen inlet, stirrer, condenser and thermocouple. The flask contents were heated slowly until they reached 135° C. and then this temperature was maintained for two hours. 5 was added and the temperature was adjusted to 127° C. 6 and 7 were added, followed one minute later by 8. After the exotherm, the temperature was adjusted to 116° C. and this temperature was maintained for two hours. The resin mixture (621.4 g) was dispersed in aqueous medium by adding it to a mixture of 22.66 g of sulfamic acid and 337.27 g of deionized water warmed to 30° C. under vigorous agitation. After 30 minutes, 5.34 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 32.0 percent. The reaction product had Z average molecular weight of 11 238 (determined by gel permeation chromatography in DMF using polystyrene as a standard).

Example 15

|   |   | Mass (/g) |
|---|---|---|
| 1 | rosin adduct from Example 11 | 113.0 |
| 2 | EPON 828 | 86.27 |
| 3 | ethyltriphenyl phosphonium iodide | 0.14 |
| 4 | methyl isobutyl ketone | 9.06 |
| 5 | methyl isobutyl ketone | 2.87 |
| 6 | crosslinker | 86.94 |
| 7 | DETA diketimine | 6.79 |
| 8 | N-methyl ethanolamine | 1.36 |

Components 1-4 were charged to a flask equipped with a nitrogen inlet, stirrer, condenser and thermocouple. The flask contents were heated slowly until they reached 135° C. and then this temperature was maintained for two hours. 5 was added and the temperature was adjusted to 127° C. 6 and 7 were added, followed one minute later by 8. After the exotherm, the temperature was adjusted to 116° C. and this temperature was maintained for two hours. The resin mixture (275.8 g) was dispersed in aqueous medium by adding it to a mixture of 11.4 g of sulfamic acid and 150.7 g of deionized water warmed to 30° C. under vigorous agitation. After 30 minutes, 2.37 g of a 30% solution of gum rosin in butylcarbitol formal was added followed, 45 minutes later by 220.12 g of deionized water. The dispersion was thinned with more deionized water and vacuum stripped to remove organic solvent to give a dispersion having a solids content of 23.0 percent. The reaction product had Z average molecular weight of 12 204 (determined by gel permeation chromatography in DMF using polystyrene as a standard).

Example 16

|   |   | Mass (/g) |
|---|---|---|
| 1 | rosin adduct from Example 12 | 258.8 |
| 2 | EPON 828 | 187.79 |
| 3 | ethyltriphenyl phosphonium iodide | 0.30 |
| 4 | methyl isobutyl ketone | 20.30 |
| 5 | methyl isobutyl ketone | 6.44 |
| 6 | crosslinker | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 135° C. and then this temperature was maintained for two hours. 5 was added and the temperature was adjusted to 127° C. 6 and 7 were added, followed one minute later by 8. After the exotherm, the temperature was adjusted to 116° C. and this temperature was maintained for two hours. The resin mixture (618.07 g) was dispersed in aqueous medium by adding it to a mixture of 25.54 g of sulfamic acid and 831.07 g of deionized water warmed to 30° C. under vigorous agitation. After 30 minutes, 5.32 g of a 30% solution of gum rosin in butylcarbitol formal was added. The dispersion was thinned with more deionized water and vacuum stripped to remove organic solvent to give a dispersion having a solids content of 33.0 percent. The reaction product had Z average molecular weight of 10474 (determined by gel permeation chromatography in DMF using polystyrene as a standard).

The crosslinker was prepared as described in Example 8 above.

Example 17

This example describes the preparation of an electrodeposition bath composition of the present invention. The electrodeposition bath was prepared from a mixture of the following ingredients:

| INGREDIENTS | PARTS BY WEIGHT |
|---|---|
| Cationic dispersion and deionized water | See table below |
| Plasticizer | 8.3 |
| Flexibilizer | 121.9 |
| Flow Additive | 80.6 |
| ethylene glycol monohexylether | 12.4 |
| propylene glycol monomethyl | 6.2 |
| pigment paste prepared as described above in Example 9 | 140.8 |

| Cationic Dispersion | Parts Dispersion by Weight | Parts Deionized Water by Weight |
|---|---|---|
| Example 13 | 1090.9 | 938.8 |

The paint was made by adding the plasticizer, flexibilizer, flow additive, and solvents to the cationic dispersion under agitation. The blend was then reduced with 500 parts of the deionized water. The pigment paste was reduced with 300 parts of the deionized water, and then blended into the reduced resin mixture under agitation. The remainder of the deionized water was then added under agitation. Final bath solids were about 20%, with a pigment to resin ratio of 0.12:1.0. The paint was allowed to agitate at least two hours. Thirty percent of the total paint weight was removed by ultrafiltration and replaced with deionized water.

The pigment paste and catalyst paste were prepared as described in Example 9 above.

Electrocoating Procedure:

Bath compositions prepared as described above were electrodeposited onto phosphated cold rolled steel panels, commercially available from ACT Laboratories. The phosphate, which is commercially available from PPG Industries, Inc., is Chemfos 700 with a deionized water rinse. Conditions for cationic electrodeposition were 2 minutes at 92° F., voltages are listed in the chart below, specific to each resin to yield a cured dry film thickness of about 0.80 mils. The electrocoated substrate was cured in an electric oven for 25 minutes at 325° F. The electrocoated panels were tested against a standard electrocoat product and the results are recorded in the following table. The control product is ED-6280 available from PPG Industries, Inc.

|  | Test Paint based on the ecoat of Example 17 | ED6280 Control Paint |
|---|---|---|
| Applied Voltage | 210 | 175 |
| Scribe creep - 30 cycles Corrosion Testing | 5.5 mm | 5.0 mm |
| Solvent Resistance | Very slight mar | No effect |
| QCT humidity adhesion | 10 | 10 |

The above results demonstrate that the compositions of the invention derived in part from a low cost renewable resource have properties similar to a standard market acceptable electrocoat.

Example 18

|  |  | Mass (/g) |
|---|---|---|
| 1 | EPON 828 | 483.61 |
| 2 | gum rosin | 528.92 |
| 3 | ethyltriphenyl phosphonium iodide | 0.69 |
| 4 | methyl isobutyl ketone | 58.97 |
| 5 | MDI[19] | 52.03 |
| 6 | methyl isobutyl ketone | 63.03 |
| 7 | crosslinker prepared as described below | 389.77 |
| 8 | DETA diketimine | 30.46 |
| 9 | N-methyl ethanolamine | 6.10 |
| 10 | methyl isobutyl ketone | 2.30 |

[19]LUPRANATE M20S, available from BASF Corp.

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (727.1 g) was dispersed in aqueous medium by adding it to a mixture of 21.29 g of sulfamic acid and 361.45 g of deionized water warmed to 30° C. under vigorous agitation. After 30 minutes, 6.09 g of a 30% solution of gum rosin in butylcarbitol formal was added followed, 45 minutes later by 557.99 g of deionized water. The dispersion was thinned with more deionized water and vacuum stripped to remove organic solvent to give a dispersion having a solids content of 45.7 percent. The reaction product had Z average molecular weight of 28 358 (determined by gel permeation chromatography in DMF using polystyrene as a standard).

Example 19

|  |  | Mass (/g) |
|---|---|---|
| 1 | EPON 828 | 479.14 |
| 2 | gum rosin | 524.02 |
| 3 | ethyltriphenyl phosphonium iodide | 0.68 |
| 4 | methyl isobutyl ketone | 58.42 |
| 5 | MDI | 64.43 |
| 6 | methyl isobutyl ketone | 77.34 |
| 7 | crosslinker | 386.16 |
| 8 | DETA diketimine | 30.18 |
| 9 | N-methyl ethanolamine | 6.04 |
| 10 | methyl isobutyl ketone | 2.28 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (732.9 g) was dispersed in aqueous medium by adding it to a mixture of 21.09 g of sulfamic acid and 355.82 g of deionized water warmed to 30° C. under vigorous agitation. After 30 minutes, 6.09 g of a 30% solution of gum rosin in butylcarbitol formal was added followed, 45 minutes later by 557.96 g of deionized water. The dispersion was thinned with more deionized water and vacuum stripped to remove organic solvent to give a dispersion having a solids content of 42.7 percent. The reaction product had Z average molecular weight of 43 489 (determined by gel permeation chromatography in DMF using polystyrene as a standard).

Example 20

|  |  | Mass (/g) |
|---|---|---|
| 1 | EPON 828 | 473.88 |
| 2 | gum rosin | 518.28 |
| 3 | ethyltriphenyl phosphonium iodide | 0.68 |
| 4 | methyl isobutyl ketone | 57.78 |
| 5 | MDI | 76.61 |
| 6 | methyl isobutyl ketone | 91.77 |
| 7 | crosslinker | 381.93 |
| 8 | DETA diketimine | 29.84 |
| 9 | N-methyl ethanolamine | 8.36 |
| 10 | methyl isobutyl ketone | 2.25 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (738.6 g) was dispersed in aqueous medium by adding it to a mixture of 20.86 g of sulfamic acid and 350.28 g of deionized water warmed to 30° C. under vigorous agitation. After 30 minutes, 6.09 g of a 30% solution of gum rosin in butylcarbitol formal was added followed, 45 minutes later by 557.93 g of deionized water. The dispersion was thinned with more deionized water and vacuum stripped to remove organic solvent to give a dispersion having a solids content of 40.2 percent. The reaction product had Z average molecular weight of 72 971 (determined by gel permeation chromatography in DMF using polystyrene as a standard).

Example 21

|   |   | Mass (/g) |
|---|---|---|
| 1 | EPON 828 | 470.62 |
| 2 | gum rosin | 557.14 |
| 3 | ethyltriphenyl phosphonium iodide | 0.70 |
| 4 | methyl isobutyl ketone | 59.86 |
| 5 | MDI | 76.72 |
| 6 | methyl isobutyl ketone | 96.79 |
| 7 | crosslinker | 336.28 |
| 8 | DETA diketimine | 39.42 |
| 9 | N-methyl ethanolamine | 3.68 |
| 10 | methyl isobutyl ketone | 2.34 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (739.6 g) was dispersed in aqueous medium by adding it to a mixture of 16.72 g of sulfamic acid and 347.59 g of deionized water warmed to 30° C. under vigorous agitation. After 30 minutes, 6.10 g of a 30% solution of gum rosin in butylcarbitol formal was added followed, 45 minutes later by 555.00 g of deionized water. The dispersion was thinned with more deionized water and vacuum stripped to remove organic solvent to give a dispersion having a solids content of 44.0 percent. The reaction product had Z average molecular weight of 55 815 (determined by gel permeation chromatography in DMF using polystyrene as a standard).

Example 22

|   |   | Mass (/g) |
|---|---|---|
| 1 | EPON 828 | 313.18 |
| 2 | Rosin S[20] | 342.52 |
| 3 | ethyltriphenyl phosphonium iodide | 0.45 |
| 4 | methyl isobutyl ketone | 38.19 |
| 5 | MDI | 42.75 |
| 6 | methyl isobutyl ketone | 47.84 |
| 7 | crosslinker | 270.49 |
| 8 | DETA diketimine | 19.72 |
| 9 | N-methyl ethanolamine | 3.95 |
| 10 | methyl isobutyl ketone | 1.49 |

[20]Tall oil rosin, available from MeadWestvaco.

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (972.51 g) was dispersed in aqueous medium by adding it to a mixture of 27.58 g of sulfamic acid and 471.83 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 38.1 percent. The reaction product had Z average molecular weight of 11 710 (determined by gel permeation chromatography in DMF using polystyrene as a standard).

Example 23

|   |   | Mass (/g) |
|---|---|---|
| 1 | EPON 828 | 316.89 |
| 2 | SYLVAROS NCY | 338.80 |
| 3 | ethyltriphenyl phosphonium iodide | 0.45 |
| 4 | methyl isobutyl ketone | 38.19 |
| 5 | MDI | 42.75 |
| 6 | methyl isobutyl ketone | 47.84 |
| 7 | crosslinker | 270.49 |
| 8 | DETA diketimine | 19.72 |
| 9 | N-methyl ethanolamine | 3.95 |
| 10 | methyl isobutyl ketone | 1.49 |

Components 1-4 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 5 and 6 were added. The temperature dropped to 127° C. and was maintained for 30 minutes. 7 and 8 were added, followed one minute later by 9 and 10. After the exotherm, the temperature was adjusted to 116° C. and this temperature was maintained for two hours. The resin mixture (972.51 g) was dispersed in aqueous medium by adding it to a mixture of 27.58 g of sulfamic acid and 471.83 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 41.3 percent. The reaction product had Z average molecular weight of 16 728 (determined by gel permeation chromatography in DMF using polystyrene as a standard).

Example 24

|   |   | Mass (/g) |
|---|---|---|
| 1 | EPON 828 | 310.56 |
| 2 | gum rosin | 339.65 |
| 3 | ethyltriphenyl phosphonium iodide | 0.44 |
| 4 | methyl isobutyl ketone | 38.30 |
| 5 | Trimethylol propane | 7.39 |
| 6 | MDI | 42.76 |
| 7 | methyl isobutyl ketone | 48.59 |
| 8 | crosslinker | 268.23 |
| 9 | DETA diketimine | 19.56 |
| 10 | N-methyl ethanolamine | 3.92 |
| 11 | methyl isobutyl ketone | 1.48 |

Components 1-5 were charged to a flask equipped with a nitrogen inlet, stirrer, condenser and thermocouple. The flask contents were heated slowly until they reached 140° C. and then this temperature was maintained for 45 minutes. The temperature was adjusted to 132° C. and then 6 and 7 were added. The temperature dropped to 127° C. and was maintained for 30 minutes. 8 and 9 were added, followed one minute later by 10 and 11. After the exotherm, the temperature was adjusted to 116° C. and this temperature was maintained for two hours. The resin mixture (972.8 g) was dispersed in aqueous medium by adding it to a mixture of 27.34 g of sulfamic acid and 471.78 g of deionized water warmed to 30° C. under vigorous agitation. After 30 minutes, 8.08 g of a 30% solution of gum rosin in butylcarbitol formal was added followed, 45 minutes later by 740.00 g of deionized water. The dispersion was thinned with more deionized water and vacuum stripped to remove organic solvent to give a dispersion having a solids content of 42.1 percent. The reaction product had Z average molecular weight of 44 382 (determined by gel permeation chromatography in DMF using polystyrene as a standard).

Whereas particular embodiments of this invention have been described above for purposes of illustration, it will be evident to those skilled in the art that numerous variations of the details of the present invention may be made without departing from the invention as described in the appended claims.

Therefore we claim:

1. A cationic electrodepositable coating comprising rosin, wherein the rosin is reacted with an epoxy resin having an epoxide equivalent weight of 180 to 1200, and the reaction product of rosin and epoxy resin forms part of a cationic resin backbone of the coating.

2. The coating of claim 1, wherein the rosin is reacted with a dienophile comprising a carboxylic group prior to being reacted with an epoxy resin.

3. The coating of claim 2, wherein the dienophile comprises acrylic acid.

4. The coating of claim 2, wherein at least some of the epoxy groups are reacted with cationic salt-forming compounds.

5. The coating of claim 1, wherein the rosin is reacted with a linking molecule prior to being reacted with an epoxy resin.

6. The coating of claim 5, wherein at least some of the epoxy groups are reacted with cationic salt-forming compounds.

7. The coating of claim 1, wherein the rosin comprises 10 to 90 wt % of the coating, based on total solids weight.

8. The coating of claim 1, wherein the rosin comprises 10 to 60 wt % of the coating, based on total solids weight.

9. The coating of claim 1, wherein the coating comprises a colorant.

10. The coating of claim 1, wherein the coating is substantially clear.

11. The coating of claim 1, wherein the epoxy resin comprises an aromatic or cyclic based epoxy.

12. The coating of claim 11, wherein the aromatic based epoxy is a bisphenol A based epoxy.

13. The coating of claim 1, wherein acrylic is not the primary film former.

14. The coating of claim 1, wherein the coating is substantially free from acrylic.

15. The coating of claim 1, wherein the reaction product of the rosin and the epoxy resin is further reacted with a compound having one or more hydroxy reactive groups.

16. The coating of claim 15, wherein the compound having one or more hydroxy reactive groups comprises isocyanate.

17. A cationic electrodepositable coating comprising rosin, wherein the rosin is reacted with an epoxy resin, and the reaction product of rosin and epoxy resin forms part of a cationic resin backbone of the coating, wherein the rosin is reacted with a dienophile comprising a carboxylic group prior to being reacted with an epoxy resin, wherein the epoxy resin comprises the diglycidyl ether of bisphenol A.

18. A cationic electrodepositable coating comprising rosin, wherein the rosin is reacted with an epoxy resin, and the reaction product of rosin and epoxy resin forms part of a cationic resin backbone of the coating, wherein the rosin is reacted with a linking molecule prior to being reacted with an epoxy resin, wherein the epoxy resin comprises the diglycidyl ether of bisphenol A.

* * * * *